Nov. 29, 1927.
J. G. ROBERTS
1,650,740
TRANSMITTER
Filed June 15, 1925
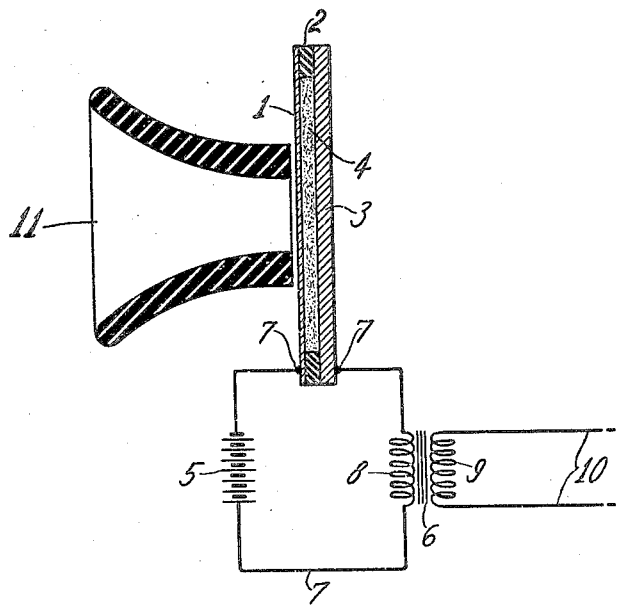
Inventor:
John G. Roberts
by R. W. Adams, Att'y.

Patented Nov. 29, 1927.

1,650,740

UNITED STATES PATENT OFFICE.

JOHN G. ROBERTS, OF DOBBS FERRY, NEW YORK, ASSIGNOR TO WESTERN ELECTRIC COMPANY, INCORPORATED, OF NEW YORK, N. Y., A CORPORATION OF NEW YORK.

TRANSMITTER.

Application filed June 15, 1925. Serial No. 37,056.

This invention relates to telephone transmitters and particularly to the type of transmitter in which sound waves are used to vary the capacity of a condenser and thereby produce electrical variations corresponding to the sounds.

An object of the invention is to secure a high degree of sensitivity and efficiency in a transmitter of the type referred to.

The invention may be realized in practice by providing a suitable plate or diaphragm in operative relation to an electrolyte and connecting the plate and electrolyte in circuit the plate or diaphragm being vibratable under the influence of sound waves and being of such a metal and of the proper polarity to give rise to the phenomenon of high capacity between the plate and the electrolyte that is peculiar to electrolytic condensers. It will be necessary, of course, to provide a second electrode in contact with the electrolyte.

The invention is capable of embodiment in various forms, one form only being illustrated in the accompanying drawing to which reference will now be made.

In the single figure a flexible diaphragm 1 is combined with an insulating washer or gasket 2 shown only where the sectional view cuts it, and a back plate 3 to form a containing space for an electrolytic filling 4, which may be in the form of a liquid or a paste or jelly. The condenser is placed in a circuit 7 including a battery 5 and the primary 8 of a transformer having a core 6 and secondary 9, the latter connected to line wires 10, 10. A mouthpiece 11 is provided as shown.

During the existence of sound in the neighborhood of the transmitter, the plate or diaphragm 1 will make motions to and fro and the capacity between the plate 1 and the electrolyte 4 will change in accordance with the sound vibration. The pulses of current emanating from the battery and impressing magnetic changes on the core 6 by virtue of the coil 8 will, in turn, give rise to alternating currents in coil 9 and deliver them via wires 10 to any desired part of the telephone system.

The diaphragm 1 may be made of aluminum, tungsten, chromium, berylium or any of the other metals which exhibit the phenomenon of high capacity toward an electrolyte when they are made the anode. Metals which behave in this way are commonly spoken of as "film-forming" metals. The metals to be used are of such character that when made the anode current will not flow between the electrolyte and the respective metal, but when made the cathode, current will flow. This is equivalent to saying that these metals permit the flow of electrons from but not to the metals. The other electrode for enabling a polarizing potential to be applied to the electrode 1 and the electrolyte 4 and the condenser transmitter to be connected in circuit may be of tin or lead or any of the other metals that have been found suitable as the non-film-forming electrode of an electrolytic condenser.

The operation of the device when sound waves are impressed on the diaphragm is as follows: By means of the battery 5 a polarizing potential is applied to the electrode 1 and the electrolyte by connecting electrodes 1 and 3 in the circuit 7. Polarization then takes place in the well known manner and causes a thin film of gas to appear on the surface of electrode 1 between electrode 1 and the electrolyte 4. This thin film of gas separates the electrode 1 from the electrolyte resulting in a value of capacity between the electrode 1 and the electrolyte which depends upon the thickness of the film of gas. When sound waves are produced near the transmitter the diaphragm-electrode 1 will vibrate to and fro in accordance with the sound vibrations. The movement of the electrode 1 will compress the thin film of gas to varying degrees thus causing changes of capacity between the electrode and the electrolyte which are proportional to the movements of the diaphragm.

It will be understood that the invention is not to be construed as limited to the structural details disclosed since it is capable of various embodiments within the scope of the appended claims.

What is claimed is:

1. A telephone transmitter comprising an electrolytic condenser, and means for varying in accordance with sound waves the inherent capacity between the electrolyte and anode of said condenser.

2. A condenser transmitter comprising a vibratable diaphragm of a substance such that when made the anode of an electrolytic cell no continuous current will flow, an electrolyte in operative relation with respect to said diaphragm, and means for connecting said diaphragm and electrolyte in a circuit, and making said diaphragm the anode.

3. A condenser transmitter of high capacity comprising two electrodes and an electrolyte, one of said electrodes being of a film-forming metal and vibratable in accordance with sound waves.

4. A condenser transmitter of high capacity comprising two electrodes and an electrolyte, one of said electrodes being mounted to be vibrated in accordance with sound waves, and a source of direct current potential applied to said electrodes, said vibratable electrode being of such material and said source of potential of such polarity as to produce surface conditions at the vibratable electrode resulting in the high capacity effect peculiar to electrolytic condensers.

5. A flexible plate adapted to be moved by the action of sound, another plate, an electrolyte between the plates, and means to polarize said plates to form an electrolytic condenser of high capacity between the electrolyte and the flexible plate.

In witness whereof, I hereunto subscribe my name this 8th day of June A. D., 1925.

JOHN G. ROBERTS.